US012636791B2

(12) United States Patent
Hsieh et al.

(10) Patent No.: US 12,636,791 B2
(45) Date of Patent: May 26, 2026

(54) SYSTEM AND METHOD FOR PICKING AND PLACING OBJECTS

(71) Applicant: Chiun Mai Communication Systems, Inc., New Taipei (TW)

(72) Inventors: Tung-Chun Hsieh, New Taipei (TW); Chung-Wei Wu, New Taipei (TW); Chih-Wei Li, New Taipei (TW); Hsin-Ko Yu, New Taipei (TW); Sung-Chuan Lee, New Taipei (TW); Tze-Chin Lo, New Taipei (TW); Chien-Ming Ko, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 193 days.

(21) Appl. No.: 18/091,153

(22) Filed: Dec. 29, 2022

(65) Prior Publication Data

US 2023/0405831 A1 Dec. 21, 2023

(30) Foreign Application Priority Data

Jun. 21, 2022 (TW) .................................. 111123079
Dec. 27, 2022 (TW) .................................. 111150237

(51) Int. Cl.
| | |
|---|---|
| *B25J 19/02* | (2006.01) |
| *B25J 9/00* | (2006.01) |
| *B25J 9/16* | (2006.01) |
| *G06T 7/55* | (2017.01) |
| *G06T 7/73* | (2017.01) |

(52) U.S. Cl.
CPC .......... *B25J 9/1697* (2013.01); *B25J 9/1612* (2013.01); *B25J 9/1682* (2013.01); *B25J 19/023* (2013.01);
(Continued)

(58) Field of Classification Search
CPC ...... B25J 9/1697; B25J 9/1612; B25J 9/1682; B25J 19/023; B25J 9/0018; B25J 9/0084;
(Continued)

(56) References Cited

U.S. PATENT DOCUMENTS

| | | | | |
|---|---|---|---|---|
| 2019/0112134 A1* | 4/2019 | Ooba | ..................... | B65G 43/08 |
| 2020/0086493 A1* | 3/2020 | Caron L'Ecuyer | .... | B25J 9/1697 |

(Continued)

FOREIGN PATENT DOCUMENTS

| | | |
|---|---|---|
| CN | 105645010 A | 6/2016 |
| CN | 105705257 A | 6/2016 |

(Continued)

*Primary Examiner* — Adam R Mott
*Assistant Examiner* — Heather J Keniry
(74) *Attorney, Agent, or Firm* — ScienBiziP, P.C.

(57) ABSTRACT

A system and a method for picking and placing objects, includes capturing at least one first image of at least one object at a first time point and at least one second image at a second time point; identifying the object in the first image and the second image; and obtaining first position information and second position information of the object; based on the first position information, the second position information, the first time point, and the second time point, calculating a moving speed of the object; calculating a target position and a target time point of the object based on the first position information, the second position information, and the moving speed; and controlling the machine arm to move at or to the target position at the target time point to pick the object.

16 Claims, 10 Drawing Sheets

(52) U.S. Cl.
CPC .................. *G06T 7/55* (2017.01); *G06T 7/75*
(2017.01); *G06T 2207/10028* (2013.01); *G06T*
*2207/20081* (2013.01); *G06T 2207/20084*
(2013.01)

(58) Field of Classification Search
CPC . B25J 9/0093; G06T 7/55; G06T 7/75; G06T
2207/10028; G06T 2207/20081; G06T
2207/20084; G05B 2219/40607; G05B
2219/45063
See application file for complete search history.

(56)     References Cited

U.S. PATENT DOCUMENTS

| | | | | |
|---|---|---|---|---|
| 2021/0241177 A1* | 8/2021 | Wang | ........................ | G06N 5/04 |
| 2021/0268660 A1* | 9/2021 | Okuyama | .............. | B25J 9/1653 |
| 2022/0088778 A1* | 3/2022 | Sun | ........................ | B25J 9/1651 |
| 2022/0226866 A1* | 7/2022 | Taylor | ........................ | B07C 5/36 |
| 2022/0289501 A1* | 9/2022 | Sun | ........................ | B25J 9/1664 |
| 2022/0289502 A1* | 9/2022 | Sun | ........................ | B25J 13/088 |
| 2022/0324658 A1* | 10/2022 | Cedarleaf-Pavy | ... | B65G 1/1378 |
| 2023/0302652 A1* | 9/2023 | Kulkarni | .............. | B25J 9/1653 |
| 2023/0303342 A1* | 9/2023 | Kulkarni | .................. | B07C 5/36 |

FOREIGN PATENT DOCUMENTS

| | | |
|---|---|---|
| CN | 108161931 A | 6/2018 |
| CN | 110329710 B | 9/2021 |
| CN | 113435374 A | 9/2021 |
| CN | 113552636 A | 10/2021 |

* cited by examiner

10a

10a

<u>10a</u>

300

600

500

SYSTEM AND METHOD FOR PICKING AND PLACING OBJECTS

CROSS-REFERENCE TO RELATED APPLICATIONS

This application claims priority to Taiwan Patent Application No. 111123079 filed on Jun. 21, 2022 and Taiwan Patent Application No. 111150237 filed on Dec. 27, 2022 in Taiwan Intellectual Property Administration, the contents of which are incorporated by reference herein.

FIELD

The subject matter herein generally relates to automation technology, and particularly to a system and a method for picking and placing objects.

BACKGROUND

As a part of developments in machine learning, a method for the identification and classification of one object among many objects has also developed. After the object has been classified, the objects need to be picked and placed according to their classifications. However, when objects on an assembly line to be picked and placed using current identification technologies, other objects may be shifted and moved in the assembly line. Due to the speed of the assembly line and the transfer operations, and the complexity of classifications of the objects, precise control of the picking and the placing of objects of different classifications remains problematic.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein but are not to be considered as limiting the scope of the embodiments.

Several definitions that apply throughout this disclosure will now be presented.

The term "coupled" is defined as connected, whether directly or indirectly through intervening components, and is not necessarily limited to physical connections. The term "substantially" is defined to be essentially conforming to the particular dimension, shape, or other feature that the term modifies, such that the component need not be exact. The term "comprising," when utilized, means "including, but not necessarily limited to", it specifically indicates open-ended inclusion or membership in the so-described combination, group, series, and the like.

As a development in machine learning, a method for the identification and classification of one object among may has also developed. After object has been classified, the objects need to be picked and placed according to its properties. However, when objects on an assembly line are to be picked and placed using current identification technology, other objects may be shifted and moved in the assembly line. Due to the speed of the line and the transfer operations, and the complicated species of the objects, precise control of the picking and placing of objects of different species remains problematic, which needs some improvements.

The present disclosure provides a method and a system for picking and placing objects, including obtaining moving speeds of the objects on a moving line and object attributes, determining objects to be picked according to the object attributes, determining positions of the objects to be picked according to the moving speeds, controlling a machine arm to pick the objects to be picked according to the positions and the moving speeds of the objects to be picked, which has advantages of easy arrangement and high precision in object picking and placing.

Figure 1:
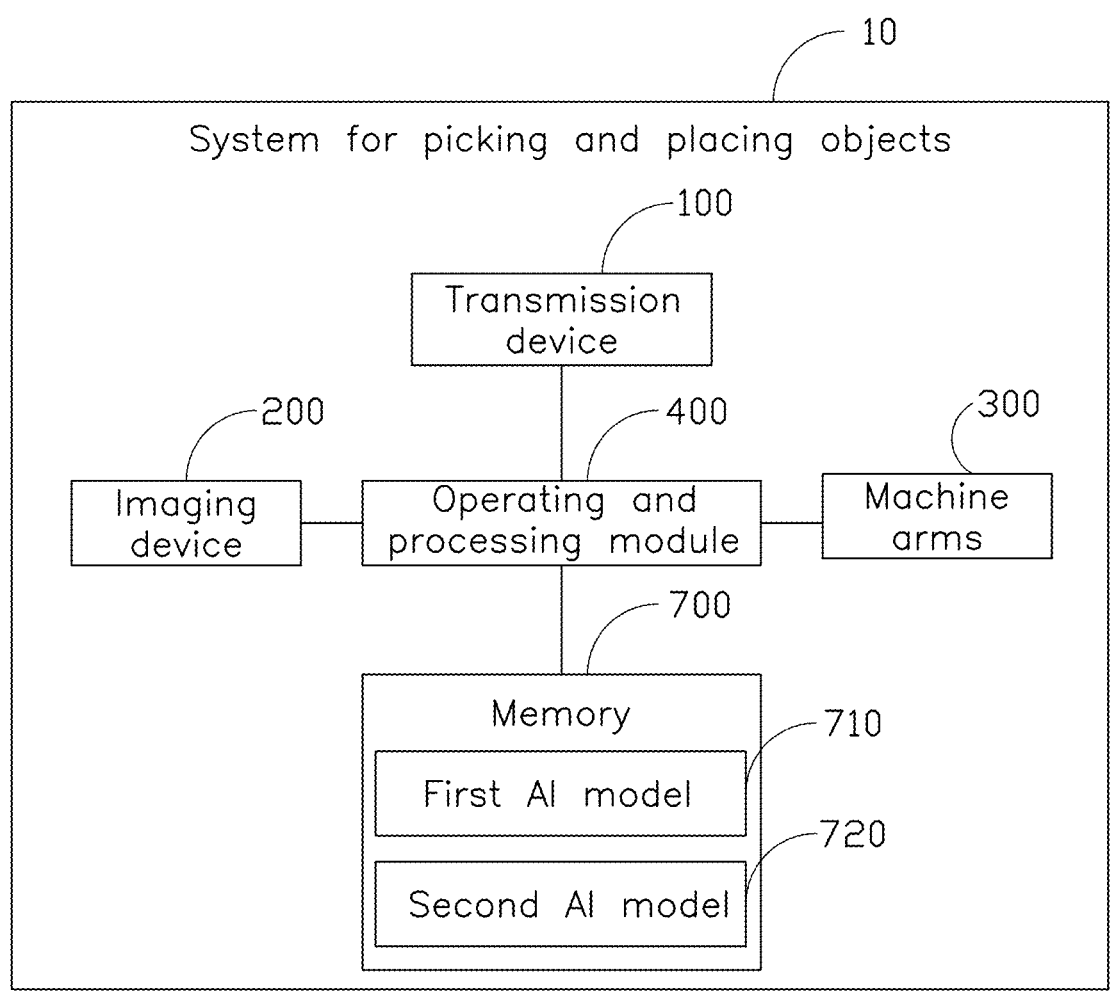
FIG. 1 illustrates a schematic diagram of at least one embodiment of a system for picking and placing objects according to the present disclosure.

FIG. 1 illustrates a schematic diagram of at least one embodiment of a system 10 for picking and placing objects. The system 10 at least includes: a transmission device 100, an imaging device 200, machine arms 300, an operating and processing module 400, and a memory 700. The memory 700 stores a first AI model 710 and a second AI model 720.

In at least one embodiment, the transmission device 100 is configured to transmit objects in a predetermined direction. The transmission device 100 may transmit objects from one position to another position at a speed. For instance, the transmission device 100 may be an orientation transmission device such as an assembly line, a conveyor belt, a transport disc, etc.

In at least one embodiment, the imaging device 200 may be arranged above the transmission device 100 and configured to obtain image information of the transmission device 100 and its cargo. In detail, the imaging device 200 is configured to capture a first image of an object on the transmission device 100 at a first time point. The imaging device 200 is further configured to capture a second image of the object on the transmission device 100 at a second time point. The imaging device 200 may include two cameras for capturing two-dimensional and three-dimensional syncretized images. Wherein the two-dimensional and three-dimensional syncretized images may include two-dimensional images and three-dimensional images having depth information. In at least one embodiment, each of the first image and the second image is a two-dimensional and three-dimensional syncretized image.

In at least one embodiment, the machine arms 300 are configured to pick and place objects. The machine arms 300, based on manner of driving, can be differentiated into different types, such as hydraulic type machine arms, pneumatic type machine arms, electrodynamic type machine arms, and/or robotistic machine arms, etc. The machine arms 300, based on manner of grasping objects, can be differentiated into different types, such as clamping type machine arms, supporting type machine arms, and/or adsorbing type machine arms, etc. Different machine arms 300 may have several different degrees of freedom, for picking objects at different angles.

In at least one embodiment, the operating and processing module 400 is configured to obtain first position information and second position information of the object on the transmission device 100 according to the first image and the second image captured sequentially by the imaging device 200. Based on the first position information, the second position information, the first time point, and the second time point, the operating and processing module 400 calculates a moving speed of the object. Based on the first position information, the second position information, and the moving speed of the object, the operating and processing module 400 calculates a target position and a target time point of the object, and controls the machine arms 300 to pick the object at the target position at the target time point.

The operating and processing module 400 includes, but is not limited to, a central processing unit (CPU), a microprocessor, a digital signal processor (DSP), a graphics processor, an application specific integrated circuit (ASIC), a field-programmable gate array (FPGA), a data processor chip, a programmable logic device (PLD), a discrete gate/transistor logic device, or a discrete hardware component. The operating and processing module 400 may be a control unit and electrically connected to other elements of the system 10 through interfaces or a bus. The operating and processing module 400 may also be a control circuit formed by several tubes or transistors as switches.

The imaging device 200, the machine arms 300, and the operating and processing module 400 are in communicably connection. For instance, the imaging device 200 and the machine arms 300 are communicably connected to the operating and processing module 400 through wireless communication technology or wired communication technology, thus, the imaging device 200 and the machine arms 300 can exchange data and information with the operating and processing module 400.

In at least one embodiment, the operating and processing module 400 can be communicably connected to the transmission device 100, to obtain the transmission speed from the transmission device 100. For instance, when the transmission device 100 is a chip-controlled assembly line, the operating and processing module 400 may obtain the transmission speed of the transmission device 100 through the chip in the transmission device 100, the object on the transmission device 100 has the same moving speed as the transmission device 100. In at least one embodiment, after the operating and processing module 400 obtains the position of the object from the imaging device 200, the operating and processing module 400 does not need to calculate the moving speed of the object, but based on the transmission speed of the transmission device 100, the first position information, and the second position information, can calculate the target position and target time point of the object, and control one of the machine arms 300 to move and pick the object at the target position and at the target time point.

In at least one embodiment, the memory 700 stores the first AI model 710 and the second AI model 720. The second AI model 720 is configured to adjust the target position and the target time point of the at least one object according to the moving speed and a plurality of position information of the at least one object. For instance, the second AI model 720 may be a linear regression analysis model such as a Support Vector Regression (SVR) model, a Decision Tree model, a Generalized Linear Models (GLM), a Bayesian Estimation in Generalized Linear Models (BGLM), a K Nearest Neighbors (KNN), a Bayesian Regularized Neural Network (BRNN), etc., being not limited by the present disclosure.

In at least one embodiment, when the memory 700 stores the first AI model 710, the operating and processing module 400 is configured to obtain a plurality of images of the at least one object on the transmission device 100 through the imaging device 200 at a plurality of time points, and identify the at least one object in the plurality of images to obtain a plurality of position information of the at least one object on the transmission device 100 through the first AI model 710. The first AI model 710 of at least one embodiment may be any AI image identification models of the present technical field, and can be optimized or not optimized according to actual demands; the models may include but is not limited to You Only Look Once (YOLO).

Figure 2:
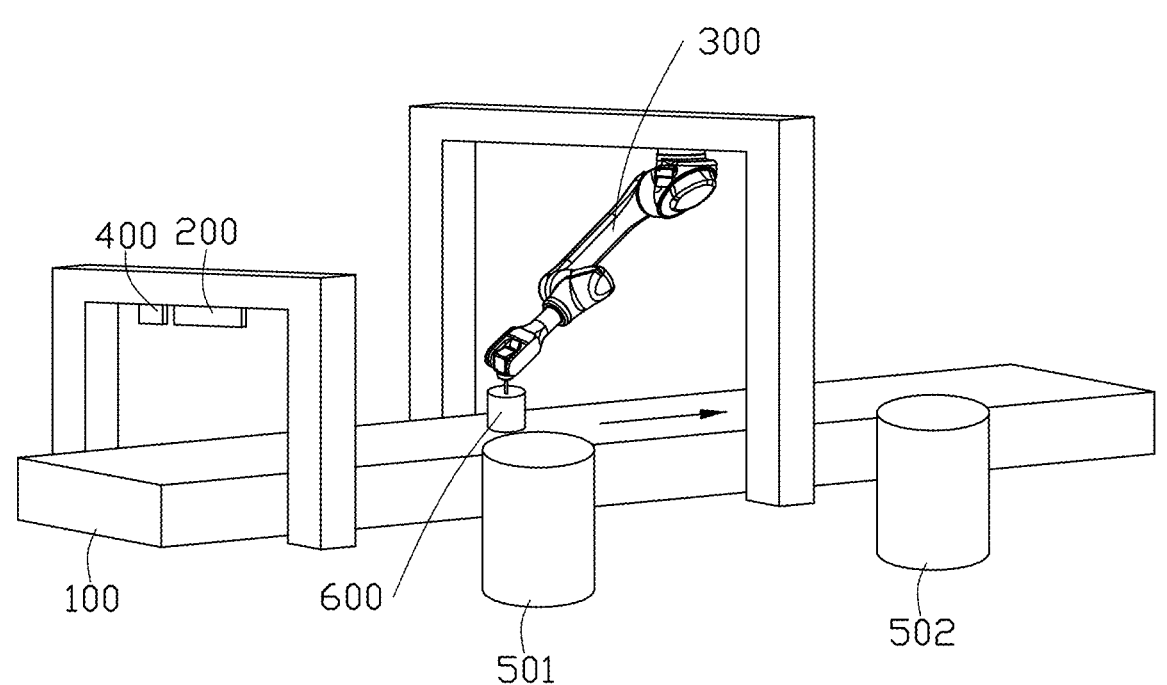
FIG. 2 illustrates a structural schematic diagram of at least one embodiment of the system for picking and placing objects according to the present disclosure.

FIG. 2 illustrate a structural schematic diagram of at least one embodiment of the system 10a for picking and placing objects according to the present disclosure. The system 10a includes: the transmission device 100, the imaging device 200, the machine arm 300, the operating and processing module 400, a first storage bunker 501, a second storage bunker 502, and an object 600.

Operating processes of the system 10a are as follows.

In at least one embodiment, an object 600 is placed on the transmission device 100, the object 600 is transmitted along a predetermined direction by the transmission device 100 after the transmission device 100 is activated, such as arrow direction shown in FIG. 2. One of ordinary skill in the art may place a plurality of objects on the transmission device 100 according to actual demands, the quantity of the objects on the transmission device 100 is unlimited in the present disclosure.

After the transmission device 100 is activated, the imaging device 200 captures continuously at least two two-dimensional and three-dimensional syncretized images, and transmits same to the operating and processing module 400. The operating and processing module 400 identifies same objects 600 according to the at least two two-dimensional and three-dimensional syncretized images. The operating and processing module 400 obtains position information of the objects 600 in the two syncretized images according to depth information of the two syncretized images, and based on a time difference between the two syncretized images, calculates a position and a moving speed of each object.

The operating and processing module 400 assigns corresponding machine arms to pick and place different objects according to the position and the moving speed of each object. For instance, as shown in FIG. 2, when the object 600 is within a picking and placing area of the machine arm 300, the operating and processing module 400 controls the machine arm 300 to pick the object 600.

The machine arms 300 may place the objects 600 to a corresponding storage bunker according to the positions. For instance, the machine arm 300 may place the objects 600 in the first storage bunker 501.

Figure 3A:
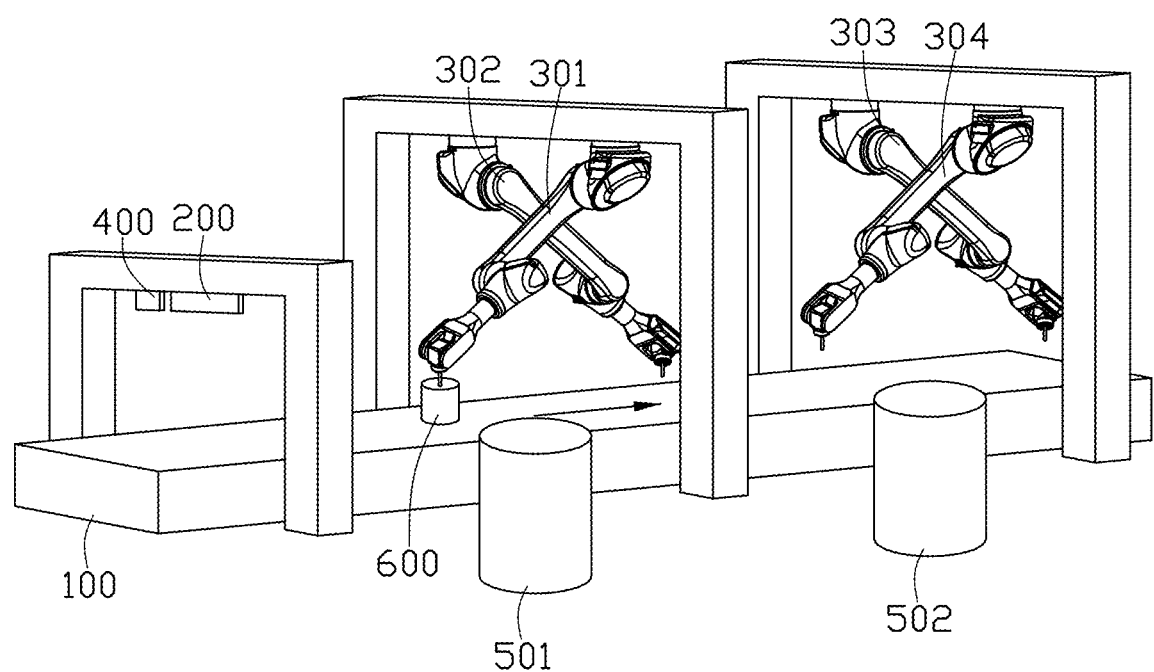
FIGS. 3A and 3B illustrate structural schematic diagrams of another embodiment of the system for picking and placing objects according to the present disclosure.
Figure 3B:
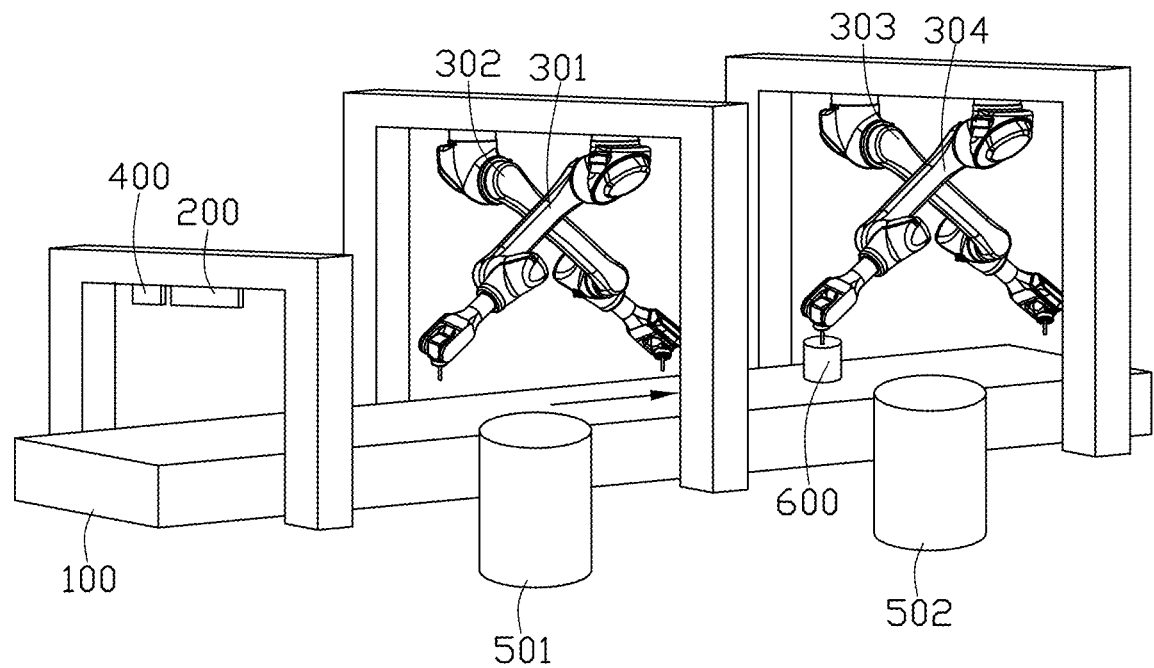

FIGS. 3A and 3B illustrate structural schematic diagrams of at least one embodiment of the system 10a for picking and placing objects according to the present disclosure. The system 10a includes: the transmission device 100, the imaging device 200, the machine arm 300, the operating and processing module 400, a first storage bunker 501, a second storage bunker 502, and an object 600. In at least one embodiment as shown in FIGS. 3A and 3B, the machine arm 300 may include a plurality of machine arms, such as a first machine arm 301, a second machine arm 302, a third machine arm 303, and a fourth machine arm 304.

Operating processes of the system 10a are as follows.

In at least one embodiment, an object 600 is placed on the transmission device 100, the object 600 is transmitted along a predetermined direction by the transmission device 100 after the transmission device 100 is activated, such as arrow direction shown in FIG. 3A. One of ordinary skill in the art may place a plurality of objects on the transmission device 100 according to actual demands, the quantity of the objects on the transmission device 100 is unlimited in the present disclosure.

After the transmission device 100 is activated, the imaging device 200 captures continuously at least two two-dimensional and three-dimensional syncretized images, and transmits same to the operating and processing module 400. The operating and processing module 400 identifies same objects 600 according to the at least two two-dimensional and three-dimensional syncretized images. The operating and processing module 400 obtains position information of the objects 600 in the two syncretized images according to depth information of the two syncretized images, and based on a time difference between the two syncretized images, calculates a position and a moving speed of each object.

The operating and processing module 400 assigns corresponding machine arms to pick and place different objects according to the position and the moving speed of each object. For instance, as shown in FIG. 3A, when the object 600 is within a picking and placing area of the first machine arm 301, the operating and processing module 400 controls the first machine arm 301 to pick the object 600. For instance, as shown in FIG. 3B, when the object 600 is within a picking and placing area of the fourth machine arm 304, the operating and processing module 400 controls the fourth machine arm 304 to pick the object 600.

The machine arms 300 may place the objects 600 to a corresponding storage bunker according to the positions. For instance, the first machine arm 301 and the second machine arm 302 may place the objects 600 in the first storage bunker 501, and the third machine arm 303 and the fourth machine arm 304 may place the objects 600 to the second storage bunker 502. For instance, as shown in FIG. 3A, after the first machine arm 301 picks the object 600, the first machine arm 301 places the object 600 into the first storage bunker 501. For instance, as shown in FIG. 3B, after the fourth machine arm 304 picks the object 600, the fourth machine arm 304 places the object 600 into the second storage bunker 502.

It should be known that, the first machine arm 301, the second machine arm 302, the third machine arm 303, and the fourth machine arm 304 as shown in FIGS. 3A and 3B are examples for the present disclosure, a number and an arrangement of the machine arms of the system 10a can be set according to actual demands, not being limited by the present disclosure.

It should be known that, the transmission device 100 may simultaneously transmit objects 600 of different types. The system 10a may pick and place objects 600 of predetermined types according to actual demands. In other embodiments, the system 10a can pick and place objects 600 of one or more types, not being limited by the present disclosure.

Figure 4:
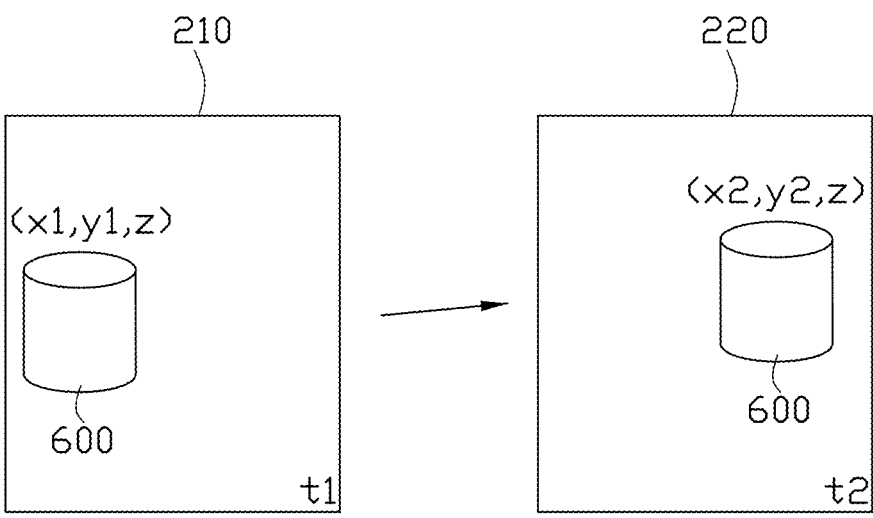
FIG. 4 illustrates a schematic diagram of at least one embodiment of transmitting an object by the system for picking and placing objects according to the present disclosure.

FIG. 4 illustrates a schematic diagram of at least one embodiment of transmitting an object 600 by the system for picking and placing objects.

FIG. 4 illustrates a moving path of the object 600 obtained from a first image 210 and a second image 220 of the object on the transmission device 100 by the operating and processing module 400. Each of the first image 210 and the second image 220 is a two-dimensional and three-dimensional syncretized image, which includes graphic information and depth information of the object 600. It should be known that, it may be difficult to locate the object in the image according to the graphic information, thus the depth information may help for obtaining the position of the object 600. The operating and processing module 400 is configured to obtain first position information (x1, y1, z) in the first image 210 of the object 600 according to the depth information of the first image 210. The operating and processing module 400 is configured to obtain second position information (x2, y2, z) in the second image 220 of the object 600 according to the depth information of the second image 220. A first time point t1 of capturing the first image 210, a second time point t2 of capturing the second image 220, and a time difference between the first time point t1 and the second time point t2 can be obtained by the operating and processing module 400, based on the time difference, the first position information (x1, y1, z), and the second position information (x2, y2, z), the operating and processing module 400 calculates a position difference of the object 600 in the first image 210 and the second image 220, and calculates the moving speed of the object 600 according to the time difference and the position difference. The operating and processing module 400 further calculates a target position and a target time point of the object 600, and controls the machine arms 300 to pick the object at the target position at the target time point.

Figure 5:
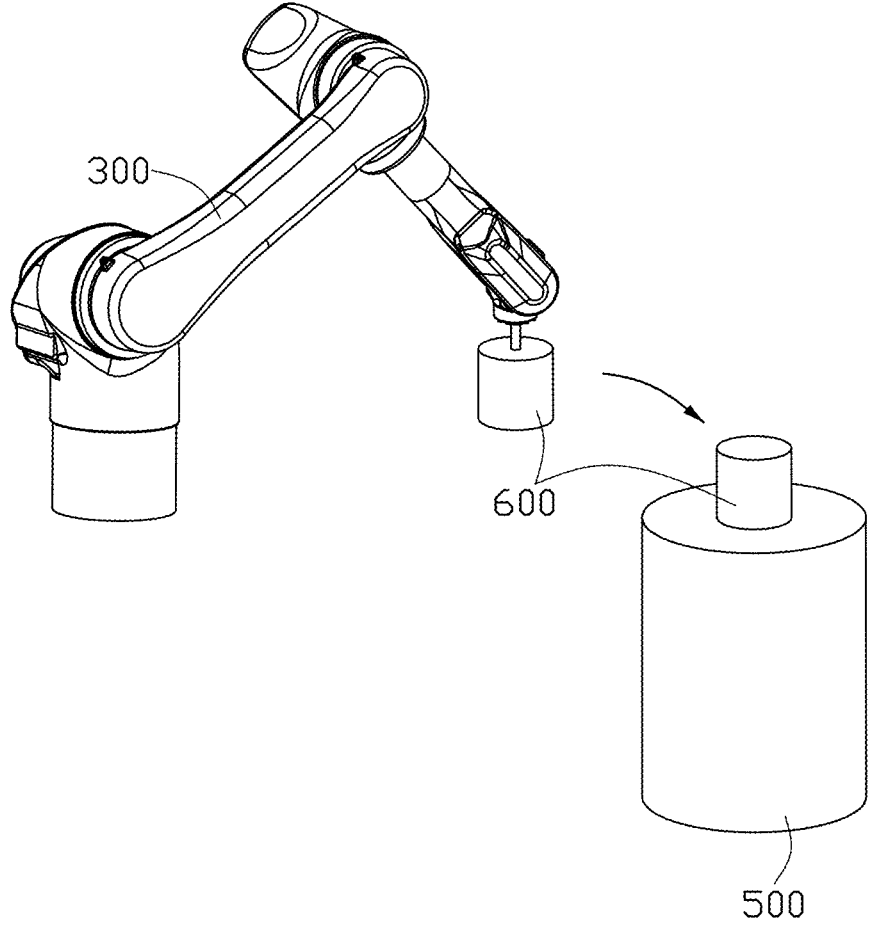
FIG. 5 illustrates a schematic diagram of at least one embodiment of placing the object by the system for picking and placing objects according to the present disclosure.

FIG. 5 illustrates a schematic diagram of at least one embodiment of placing the object 600 by the machine arm 300 of the system according to the present disclosure.

The operating and processing module 400 calculates a weight of the object 600 according to the first image 210 and the second image 220 captured by the imaging device 200. In at least one embodiment, the operating and processing module 400 estimates an area and a volume of the object 600 according to two-dimensional information and three-dimensional information of the object 600 in the first image 210 and the second image 220. The operating and processing module 400 further obtains a picking position distance and a placing distance of a placing position of the machine arm 300 according to the target position of the object 600. The picking position distance of the machine arm 300 may be a distance between the machine arm 300 and the target position of the object 600; the placing distance of the placing position may be a distance between the machine arm 300 and the placing position. The operating and processing module 400 further obtains a placing speed of the machine arm 300 placing the object 600 according to the placing distance, the moving speed, and the weight of the object 600.

In detail, the operating and processing module 400 may calculate a placing time of the machine arm 300 placing the object 600 through a formula (1):

$$T=(d/v)*\text{coefficient} \tag{1}$$

Wherein T may be the placing time of the machine arm 300 placing the object 600, d may be the placing distance of the placing position, the placing distance of the placing position may be the distance between the machine arm 300 and the placing position, v may be the placing speed of the machine arm 300 placing the object 600, and coefficient may be a placing coefficient of the machine arm 300 placing the object 600. The placing coefficient is in direct proportion to the weight of the object 600.

In at least one embodiment, the machine arm 300 may arrange with a gas ejector (not shown in the figures). After the machine arm 300 picks the object 600, when reaching the placing time of the object 600, the gas ejector is activated, the machine arm 300 strikes or places the object 600 into a corresponding storage bunker, such as the first storage bunker 501 or the second storage bunker 502.

In at least one embodiment, when the memory 700 stores the second AI model 720, the operating and processing module 400 is configured to adjust the target position and the target time point of the object 600 according to the moving speed and the plurality of position information of the object 600 through the second AI model 720. For instance, the second AI model 720 may be a linear regression analysis model such as a Support Vector Regression (SVR) model, a Decision Tree model, a Generalized Linear Models (GLM), a Bayesian Estimation in Generalized Linear Models (BGLM), a K Nearest Neighbors (KNN), a Bayesian Regularized Neural Network (BRNN), etc., being not limited by the present disclosure. The operating and processing module 400 calculates the target position and the target time point of the object 600, and controls the machine arm 300 to move at or to the target position at the target time point to pick the object. Since the moving speed of the machine arm 300 is an indefinite value, a more precise calculation of the time of the machine arm 300 picking the object 600 is achieved by the operating and processing module 400 setting the AI model to adjust the target time point of the machine arm 300 arriving at the target position.

Figure 6:
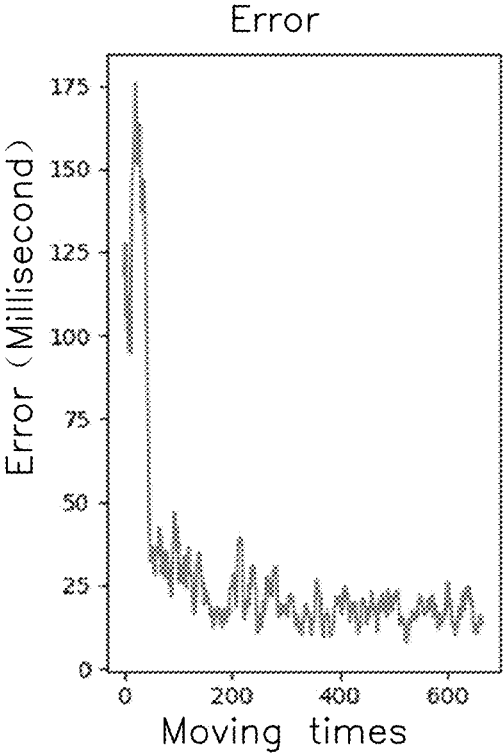
FIG. 6 illustrates a schematic diagram of at least one embodiment of a training of a second AI model according to the present disclosure.

FIG. 6 illustrates a schematic diagram of at least one embodiment of a training result of the second AI model 720. Referring to FIG. 6, the second AI model 720 may be the SVR model, when the second AI model 720 is trained for 200 times to 700 times, a time error of the machine arm 300 picking the object 600 may be decreased to 25 milliseconds (ms). The AI model used by the second AI model 720 may be an example, which is suitable for actual application value, the second AI model 720 may be different AI models according to actual demands, not being limited by the present disclosure.

Figure 7:
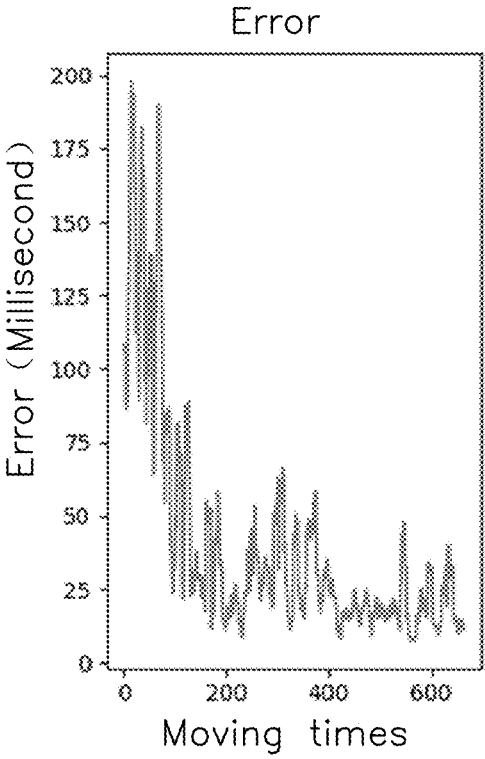
FIG. 7 illustrates a schematic diagram of at least one embodiment of a training of a second AI model according to the present disclosure.

FIG. 7 illustrates a schematic diagram of at least one embodiment of a training result of the second AI model 720. Referring to FIG. 7, the second AI model 720 may be the Decision Tree model, when the second AI model 720 is trained for 200 times to 700 times, the time error of the machine arm 300 picking the object 600 may be decreased to 50 milliseconds (ms). The AI model used by the second AI model 720 may be an example, which is suitable for actual application value, the second AI model 720 may be different AI models according to actual demands, not being limited by the present disclosure.

Figure 8:
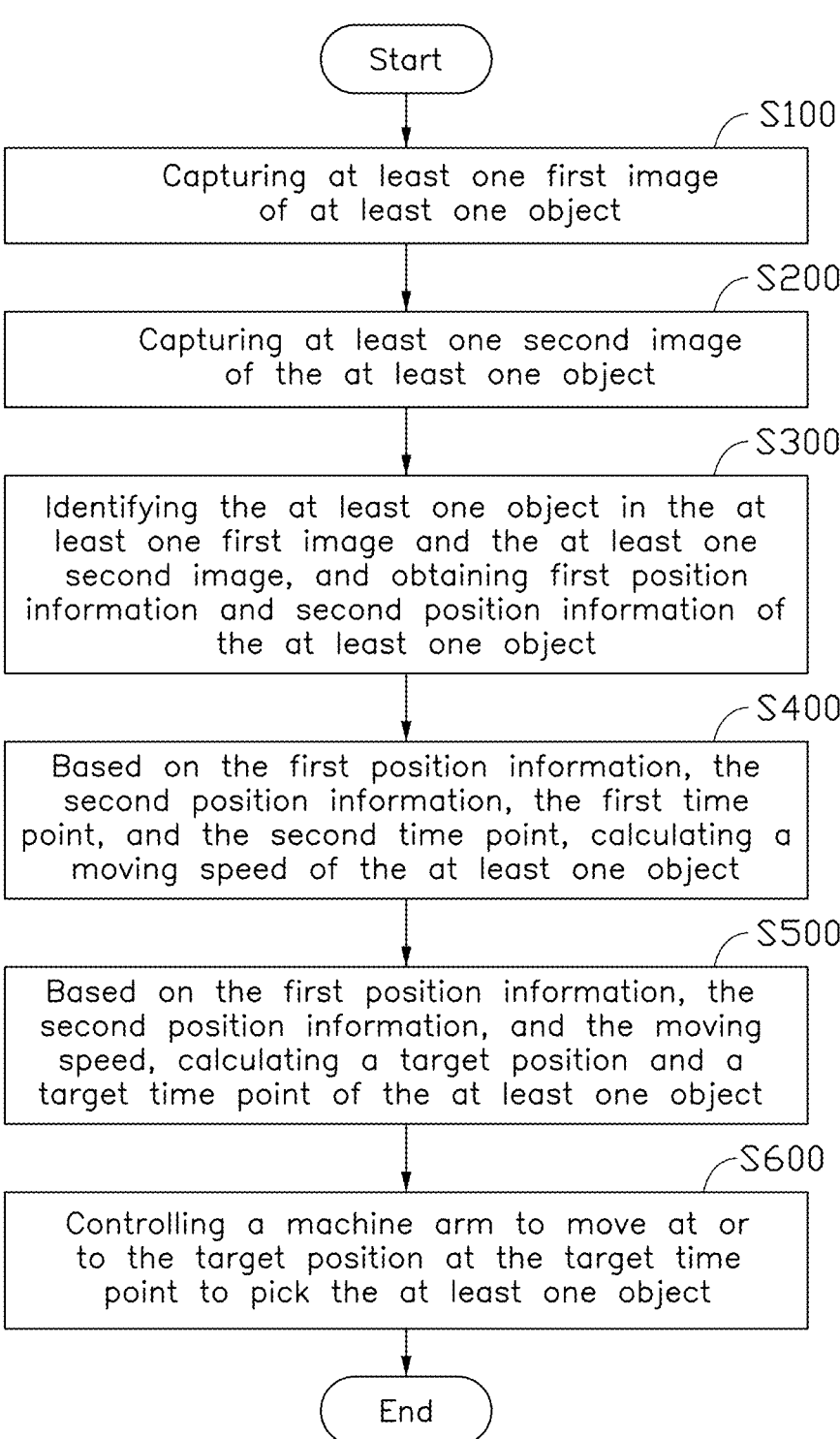
FIG. 8 illustrates a flowchart of at least one embodiment of a method for picking and placing objects according to the present disclosure.

FIG. 8 illustrates a flowchart of at least one embodiment of a method for picking and placing objects. The method may be applied in the system 10 as shown in FIG. 1 or the system 10*a* as shown in FIGS. 2, 3A, and 3B. The method is provided by way of example, as there are a variety of ways to carry out the method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S100. The method includes:

At block S100, capturing at least one first image 210 of at least one object on a conveyor or other moving line (transmission device 100).

In the block S100, the imaging device 200 is configured to capture at least one first image 210 of at least one object 600 on the transmission device 100 at the first time point, described in FIGS. 1 to 7.

At block S200, capturing at least one second image 220 of the at least one object.

In the block S200, the imaging device 200 is configured to capture at least one second image 220 of the at least one object 600 on the transmission device 100 at the second time point, described in FIGS. 1 to 7.

At block S300, identifying the at least one object in the at least one first image 210 and the at least one second image 220, and obtaining first position information and second position information of the at least one object.

In the block S300, the operating and processing module 400 is configured to identify the at least one object in the at least one first image 210 and in the at least one second image 220, and obtain first position information and second position information of the at least one object 600 on the transmission device 100, as described in FIGS. 1 to 7.

At block S400, based on the first position information, the second position information, the first time point, and the second time point, calculating a moving speed of the at least one object.

In the block S400, the operating and processing module 400 is further configured to, based on the first position information, the second position information, the first time point, and the second time point, calculate the moving speed of the at least one object 600, as described in FIGS. 1 to 7.

At block S500, based on the first position information, the second position information, and the moving speed, calculating a target position and a target time point of the at least one object.

In the block S500, the operating and processing module 400 is further configured to, based on the first position information, the second position information, and the moving speed, calculate the target position and the target time point of the at least one object 600, as described in FIGS. 1 to 7.

At block S600, controlling at least one machine arm to move at or to the target position at the target time point to pick the at least one object.

In the block S600, the operating and processing module 400 is further configured to control at least one machine arm 300 to move at or to the target position at the target time point to pick the at least one object 600, as described in FIGS. 1 to 7.

Figure 9:
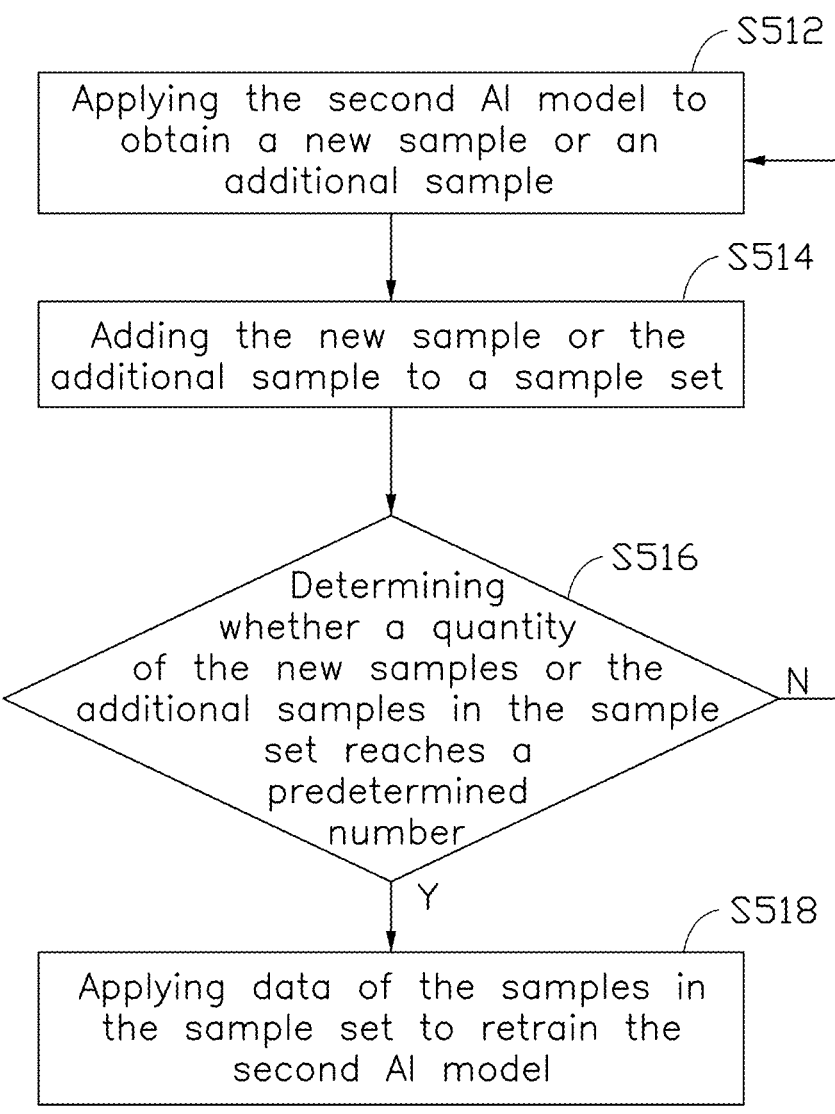
FIG. 9 illustrates a flowchart of another embodiment of a method for picking and placing objects according to the present disclosure.

FIG. 9 illustrates another flowchart of at least one embodiment of the method for picking and placing objects. After the block S500 of the method for picking and placing objects as shown in FIG. 8, the method further includes:

At block S512, applying the second AI model to obtain a new sample or an additional sample.

In the block S512, the operating and processing module 400 applies the second AI model 720 to obtain a new sample or an additional sample, the new sample or the additional sample may be an actual moving path and an actual moving time of the at least one object 600.

At block S514, adding the new sample or the additional sample to a sample set.

In the block S514, the operating and processing module 400 adds the new sample or the additional sample obtained by the second AI model 720 to the sample set. The operating and processing module 400 also stores the new sample or the additional sample obtained by the second AI model 720 to the memory 700.

At block S516, determining whether a quantity of the new samples or the additional samples in the sample set reaches a predetermined number.

In the block S516, the operating and processing module 400 determines whether a quantity of the new samples or the additional samples in the sample set reaches a predetermined number.

At block S518, applying data of the samples in the sample set to retrain the second AI model.

In the block S518, when the operating and processing module 400 determines that the quantity of the new samples or the additional samples reaches the predetermined number, the operating and processing module 400 applies the data of the samples in the sample set to retrain the second AI model 720.

In at least one embodiment, the system 10, the system 10a, and the method for picking and placing objects may be applied in the garbage collection technology filed. When operating garbage collection, traditionally selecting garbage with high value or predetermined type of garbage from the garbage heap, and burying the rest of garbage. Since there are different types of garbage and complicated conditions on site, it's hard to arrange automatic apparatus, thus the traditional garbage collection technology filed is manually operated for classification. The system 10, 10a for picking and placing objects of the present disclosure may obtain the moving speed of the garbage according to at least two images, determine the position for picking the garbage according to the moving speed of the garbage, and control the machine arm to precisely pick the garbage to be picked according to the determined position and the moving speed, which having advantages of easy arrangement and high picking precision.

The system 10, the system 10a, and the method for picking and placing objects may obtain the moving speed of the object 600 according to at least two images, determine the target position and target time point for picking of the object 600 according the moving speed of the object 600, and control the machine arm 300 to move at or to the target position at the target time point to precisely pick the object 600, which having advantages of easy arrangement and high picking precision.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A method for picking and placing objects applied in a system for picking and placing objects, the system comprising at least one machine arm and a transmission device, the transmission device being configured to transmit at least one object in a predetermined direction, the method comprising:

capturing at least one first image of the at least one object at a first time point;

capturing at least one second image of the at least one object at a second time point;

identifying the at least one object in the at least one first image and the at least one second image; and obtaining first position information and second position information of the at least one object;

based on the first position information, the second position information, the first time point, and the second time point, calculating a moving speed of the at least one object;

calculating a target position and a target time point of the at least one object based on the first position information, the second position information, and the moving speed;

controlling the at least one machine arm to move at or to the target position at the target time point to pick the at least one object;

applying an AI model to obtain a new sample or an additional sample;

adding the additional sample to a sample set;

determining whether a quantity of the additional samples in the sample set reaches a predetermined number;

when the quantity of the additional samples in the sample set is determined to have reached the predetermined number, applying data of all samples in the sample set to retrain the AI model;

calculating a weight of the at least one object based on the first image and the second image;

calculating a placing speed of the at least one machine arm placing the at least one object based on a placing distance between the at least one machine arm and a placing position, the moving speed of the at least one object, and the weight of the at least one object;

calculating a placing time of the at least one machine arm placing the at least one object based on the placing speed, the placing distance, and a placing coefficient directly proportional to the weight; and controlling the at least one machine arm to place the at least one object at the placing time.

2. The method according to claim 1, further comprising:

capturing a plurality of images of the at least one object at a plurality of time points;

identifying the at least one object in the plurality of images; and obtaining a plurality of position information of the at least one object on the transmission device; and adjusting the target position and the target time point of the at least one object based on the moving speed and the plurality of position information of the at least one object by the AI model.

3. The method according to claim 1, wherein the target position is a picking area of the at least one machine arm when the at least one machine arm is moving.

4. The method according to claim 1, further comprising:

obtaining a picking position distance and the placing distance based on the target position of the at least one object, the picking position distance is a distance between the at least one machine arm and the target position of the at least one object.

5. The method according to claim 1, wherein each of the at least one first image and each of the at least one second image is a two-dimensional and three-dimensional syncretized image.

6. The method according to claim 1, wherein the first position information and the second position information of the at least one object are obtained by:

obtaining depth information of the at least one object in the at least one first image and the at least one second image, and the first position information, the second position information, and the moving speed of the at least one object are calculated based on a time difference between the first time point and the second time point.

7. The method according to claim 1, wherein the controlling the at least one machine arm to move at or to the target position at the target time point to pick the at least one object comprises:

when there are a plurality of machine arms and a plurality of objects, assigning a machine arm of the plurality of machine arms to pick corresponding objects of the plurality of objects according to the position and the moving speed of the corresponding objects.

8. The method according to claim 1, further comprising:

controlling the at least one machine arm to place the at least one object to a corresponding storage bunker.

9. A system for picking and placing objects, the system comprising:

a transmission device configured to transmit at least one object in a predetermined direction;

an imaging device arranged above the transmission device, the imaging device configured to capture at least one first image of the at least one object at a first time point and at least one second image of the at least one object at a second time point;

at least one machine arm configured to pick and place the at least one object; and an operating and processing module, the operating and processing module configured to:

identify the at least one object in the at least one first image and the at least one second image; and obtain first position information and second position information of the at least one object;

based on the first position information, the second position information, the first time point, and the second time point, calculate a moving speed of the at least one object;

calculate a target position and a target time point of the at least one object based on the first position information, the second position information, and the moving speed;

control the at least one machine arm to move at or to the target position at the target time point to pick the at least one object;

apply an AI model to obtain a new sample or an additional sample;

add the additional sample to a sample set;

determine whether a quantity of the additional samples in the sample set reaches a predetermined number;

when the quantity of the additional samples in the sample set is determined to have reached the predetermined number, apply data of all samples in the sample set to retrain the AI model;

calculate a weight of the at least one object based on the first image and the second image;

calculate a placing speed of the at least one machine arm placing the at least one object based on a placing distance between the at least one machine arm and a placing position, the moving speed of the at least one object, and the weight of the at least one object;

calculate a placing time of the at least one machine arm placing the at least one object based on the placing speed, the placing distance, and a placing coefficient directly proportional to the weight; and control the at least one machine arm to place the at least one object at the placing time.

10. The system according to claim 9, wherein the imaging device is further configured to capture a plurality of images of the at least one object at a plurality of time points;

the operating and processing module is further configured to identify the at least one object in the plurality of images; and obtain a plurality of position information of the at least one object on the transmission device; and adjust the target position and the target time point of the at least one object based on the moving speed and the plurality of position information of the at least one object by the AI model.

11. The system according to claim 9, wherein the target position is a picking area of the at least one machine arm when the at least one machine arm is moving.

12. The system according to claim 9, wherein the operating and processing module is further configured to:

obtain a picking position distance and the placing distance based on the target position of the at least one object, the picking position distance is a distance between the at least one machine arm and the target position of the at least one object.

13. The system according to claim 9, wherein each of the at least one first image and each of the at least one second image is a two-dimensional and three-dimensional syncretized image.

14. The system according to claim 9, wherein the first position information and the second position information of the at least one object are obtained by:

obtaining depth information of the at least one object in the at least one first image and the at least one second image, and the first position information, the second position information, and the moving speed of the at least one object are calculated based on a time difference between the first time point and the second time point.

15. The system according to claim 9, wherein the operating and processing module is further configured to:

when there are a plurality of machine arms and a plurality of objects, assign a machine arm of the plurality of machine arms to pick corresponding objects of the plurality of objects according to the position and the moving speed of the corresponding objects.

16. The system according to claim 9, wherein the operating and processing module is further configured to:

control the at least one machine arm to place the at least one object to a corresponding storage bunker.

* * * * *